July 28, 1959 C. BERGER 2,896,418
METHOD AND APPARATUS OF FREEZE DEHYDRATION
Filed Nov. 7, 1955

INVENTOR
CARL BERGER

BY Toulmin & Toulmin

ATTORNEYS

2,896,418

METHOD AND APPARATUS OF FREEZE DEHYDRATION

Carl Berger, Dayton, Ohio, assignor, by mesne assignments, to Union Carbide Corporation, New York, N.Y., a corporation of New York Application November 7, 1955, Serial No. 546,086

5 Claims. (Cl. 62—58)

The present invention relates to low temperature dehydration of aqueous heat-sensitive materials, more particularly, to a method and apparatus for subjecting the material to a temperature just below the freezing point of the material to remove water therefrom by the formation of ice crystals upon a surface in contact with the material.

The most generally known process for low temperature dehydration of aqueous heat-sensitive materials comprises subjecting the material to a low temperature to form a slushy mass consisting of ice crystals and the dehydrated material. Upon completion of the freezing process the ice crystals are then suitably separated from the slushy mass. The dehydrated material may then be further processed in order to remove additional water therefrom or may be used in its present state.

Other processes and apparatus have been devised for removing water from heat-sensitive materials in this manner. In each of these instances a slushy mass comprising the material and the ice crystals is produced. This necessitates separation of the ice crystals from the slushy mass prior to any additional freezing steps which are to be performed upon the material.

In these low temperature dehydration processes the formation of ice crystals within the material is accompanied by the accumulation of ice upon the cold surfaces contacting the material. This ice is in the form of a thick mass or sheet, and has occluded therein a quantity of the material and solids which comprise the material. The agitation of the material during the freezing process serves to some extent to decrease this accumulation of ice upon the walls of the freezing tank. However, the ice accumulation problem persists regardless of the agitation of the material and periodic measures must be taken to defrost the freeze tanks. Failure to defrost the freeze tanks will result in impairing the efficiency of the freezing tank due to the insulating effects of the accumulated ice upon the cold surfaces of the tank.

It has been found that under certain conditions ice crystals may be induced to form upon a surface contacting the aqueous material. Under proper conditions these ice crystals are long, needle-like in shape and extend approximately perpendicular to the surface.

Under the conditions which are to be presently described, steps are taken to deliberately induce the formation of ice crystals upon cold surfaces of the freeze tank. These ice crystals consist of virtually pure water since less than $\frac{1}{10}$ of 1% of the material is occluded therein. Since the crystals are removed from the cold surfaces of the freezing tank while the ice structure is still crystalline and not in the form of a solid mass, there is no impairing of the refrigerating effects of the cold surfaces of the freezing tank.

The present invention provides for a nonmetallic wall to be positioned within the freezing tank in contact with the material which is to be dehydrated. The freezing tank is maintained at a temperature just below the freezing point of the heat-sensitive material. The material is conveyed into the freeze tank so that its temperature is lowered to the temperature of the tank, i.e., just below the freezing point of the material. The material is maintained at this temperature without any agitation thereof. During the period of this temperature, long, needle-like ice crystals form upon the non-metallic surface. Upon removal of a predetermined quantity of water from the material in the form of these ice crystals, the non-metallic surface is wiped clean of the crystals. The crystals are subsequently removed and the partially dehydrated material is in readiness for the next step which may be an additional freezing process.

It is therefore the principal object of this invention to provide an improved method and apparatus for the freeze dehydration of heat-sensitive aqueous materials.

It is another object of this invention to provide a method of freeze dehydration of heat-sensitive aqueous materials, wherein the water is removed in the form of ice crystals which adhere to a surface contacting the material.

It is an additional object of this invention to provide a method of producing ice crystals within a heat-sensitive material on a surface contacting the material.

It is a further object of this invention to provide an improved method of dehydrating heat-sensitive materials by subjecting the material to a thermal shock.

It is still another object of this invention to provide an apparatus for the dehydration of heat-sensitive materials by inducing the formation of ice crystals on a surface contacting the material.

Other objects and advantages of this invention will become readily apparent upon reference to the accompanying description when taken in conjunction with the following drawings, wherein.

Figure 1:
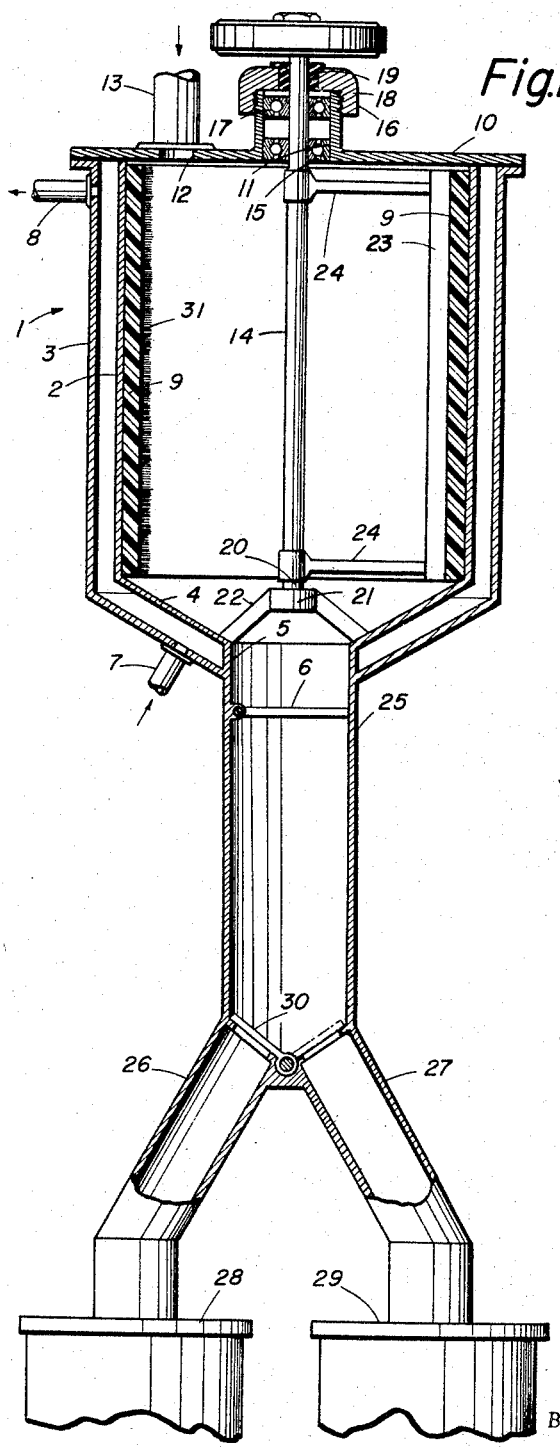
Figure 1 is a longitudinal sectional view of the freezing apparatus employed in this invention.

The process of this invention will be described as utilized in the dehydration of an aqueous heat-sensitive material. The material in this example is orange juice comprising 12% solids. An orange juice of this concentration has an initial ice forming point of 28° F.

The orange juice is poured into a freezing apparatus which is maintained at a temperature of 27° F. or just below the freezing point of the orange juice.

In most instances the juice is initially at a room temperature of the order of 70° F. The temperature of the material is then lowered to the temperature of the tank. The juice is maintained at the temperature of 27° F. for a predetermined period. There is no agitation of the material during this time.

Alternatively, the material may be subjected to a cooling process known as "thermal shock." In this process the temperature of the material is abruptly and suddenly dropped to the tank temperature. This abrupt temperature drop is achieved by maintaining the tank at a predetermined temperature and dumping the material into the tank. Suddenly subjecting the material to this temperature drop results in a thermal shock to the material.

While the juice remains within the freezing apparatus, it is in contact with a non-metallic surface. During that interval while the juice is being maintained at a temperature just below the freezing point, long needle-like ice crystals will form upon the non-metallic surface in a direction substantially perpendicular thereto.

Upon removal of a considerable quantity of water from the juice in the form of ice crystals and when the ice structure is still crystalline, the dehydrated juice is dumped from the freezing apparatus into an intermediate storage tank. The non-metallic surface is then wiped clean of the ice crystals adhering thereto. The loose ice crystals descend by gravity through the freezing apparatus where they are captured in a separate receptacle. In most instances the ice crystals will subsequently be melted in order to reclaim any solids which may be retained therein.

The dehydrated juice may then be recirculated to the freezing apparatus in order to remove additional water through a similar ice crystal formation process.

Upon removal of a sufficient quantity of water to produce the desired concentration of juice, the juice is then stored until the ultimate disposition thereof.

While the process of this invention has been described as applied to orange juice, many other aqueous materials may be dehydrated in a like manner. One of these materials is cider vinegar comprising 10% solids and having an initial ice forming point of 32° F.

It has been found that when a non-metallic surface is exposed to an aqueous material maintained at a low temperature, long, needle-like ice crystals will form on the non-metallic surface in a direction perpendicular thereto. This ice crystal formation has been found to occur on a number of non-metallic materials, including Lucite, glass, polyvinyl-chloride and wax. Furthermore, the thickness of the non-metallic walls may vary between 1/16" and 2".

While needle-like crystals are formed in the early stages of the process, after a period of time the ice formation will comprise needle-like ice crystals with sheet or plane ice filling the voids between adjacent spear-like crystals. The structure, however, was still crystalline in form rather than a solid sheet of ice.

When a thin metallic coating of the order of 1/4" was placed upon a non-metallic surface and the coating exposed to the aqueous material, a similar long, needle-like ice crystal formation occurred.

Increasing the thickness of the metallic coating upon the non-metallic surface up to about 2" resulted in thin, needle-like clusters of ice crystals upon the surface connected by planes of sheet ice. Again, however, the ice structure was crystalline rather than in sheet form as would normally occur upon a metallic surface contacting the aqueous material.

It is believed that the spear-like growth of ice crystals may be correlated with low thermal conductivity.

It is well known that heat will flow through the path of least resistance toward a given heat sink. Assuming a non-metallic surface, such as Lucite, it will be readily apparent that the heat will flow through the ice much more rapidly than through the plastic. This condition would favor a narrow, needle-like growth perpendicular to the surface and into the aqueous material. However, metallic surfaces which have relatively high thermal conductivities would tend to absorb heat rapidly through their surfaces and, consequently, the ice formed would tend to spread out over the surfaces in thin sheets.

With the description of the method of this invention in mind, an embodiment of the apparatus employed will presently be described. It will at once be apparent that other forms of apparatus may be readily employed in order to carry out the process.

Proceeding to Fig. 1 there is illustrated therein a freezing apparatus which comprises a double wall tank 1, having an inner wall 2 and an outer wall 3, both of which are metallic. The bottom of the tank 4 is sloping and has central opening 5 therein. A plate valve 6 closes the opening 5. The plate valve 6 may be operated mechanically, or electrically in order to quickly dump the contents of the tank 1.

A suitable refrigerant is circulated between the walls of the tank 1 and is admitted into the jacket formed by the two walls at the inlet 7 and removed therefrom at the outlet 8.

A non-metallic wall of Lucite 9 is secured to the inner surface of the inner wall 2.

Admission of the refrigerant between the walls 2 and 3 of the tank will cool the inner metallic wall 2 which in turn will lower the temperature of the non-metallic wall 9. In the tank construction wherein the inner metallic wall 2 is eliminated, the refrigerant directly refrigerates the non-metallic wall which is in the form of an inner tank liner.

The tank 1 is closed at the top by means of a cover 10 which has a central opening 11 and an eccentrically located opening 12. The opening 12 is connected by means of a conduit 13 to a supply of the material which is to be dehydrated.

The central opening 11 receives a wiper blade shaft 14 which is journalled therein by means of a bearing 15.

On the top surface of the cover 10 and surrounding the shaft 14 is secured a sleeve 16. A second bearing 17 is mounted within the sleeve 16 and also journals the shaft 14. The upper end of the sleeve 16 is closed by a cap 18 which contains a seal assembly 19 to form a seal between the shaft 14 and the cap 18. A belt and pulley arrangement may be used to drivingly connect the upper end of the shaft with a source of power.

The lower end of the shaft 14, indicated at 20, is supported in a bearing 21 which is positioned by means of the arms 22 mounted on the side walls of the freezing tank.

A wiper blade 23 whose length corresponds to the height of the non-metallic wall 9 is secured by means of arms 24 to the shaft 14. The blade 23 contacts the wall 9 along its entire length and rotation of the shaft 14 will result in the blade scraping the ice crystals formed on the wall 9.

A dump conduit 25 is connected to the opening 5 in the bottom wall of the tank 1. The dump conduit 25 is divided into branches 26 and 27 which communicate respectively with an ice crystal receptacle 28 and an intermediate material storage tank 29. A valve 30 is employed to direct the flow of ice crystals and material into their respective tanks.

As an alternative to the conduit and receptacle structure as described, the conduit 25 may be connected to a centrifuge. In this event the ice crystals formed upon the non-metallic wall 9 would be scraped therefrom prior to dumping the material from the tank. Subsequently, the material together with the ice crystals would be dumped into the centrifuge and he ice crystals separated from the material through the action of the centrifuge.

In either instance the ice crystals may be melted in order to reclaim any solids which may have been entrained therein. The dehydrated material is then recirculated through the freezing apparatus for additional freezing to remove additional water therefrom.

Figure 2:
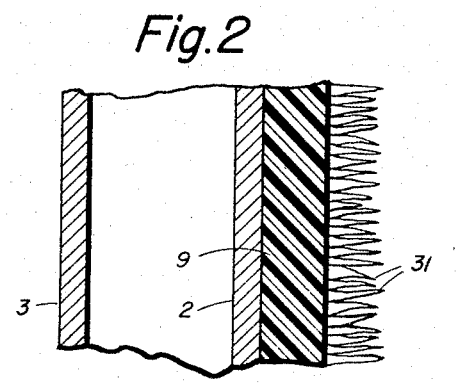
Figures 2, 3 and 4 are enlarged sectional views of a portion of the wall structure of the freezing apparatus illustrated in Figure 1, showing modifications of the surface upon which the ice crystals are to be produced.

Proceeding to Figure 2, there is illustrated in enlarged scale a section of the tank walls together with the non-metallic wall secured thereto, and a needle-like ice crystal formation 31 upon the non-metallic wall.

Figure 3:
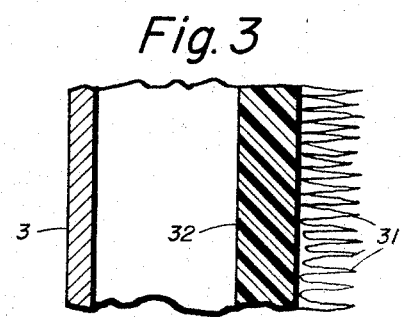

In Figure 3, which is similar to Figure 2, the freezing tank has a non-metallic inner wall 32 and the ice crystals adhere thereto.

Figure 4:
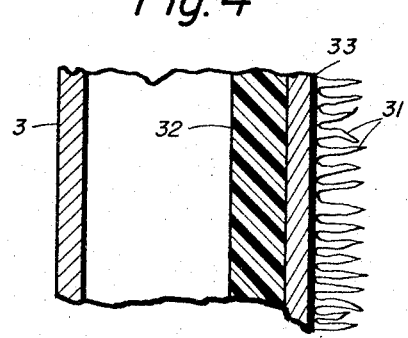

Another modification of the tank wall structure of the freezing tank is shown in Figure 4, wherein the inner wall of the freezing tank is non-metallic and is coated with a metallic surface 33. The metal coating may be silver. The ice crystal formation subsequently adheres to the metallic coating.

Thus it can be seen that the present invention discloses a method and apparatus for removing water from aqueous material by deliberately inducing the formation of ice crystals upon a surface of the freezing tank. The nature of the surface is selected to favor the formation of long, needle-like ice crystals which may be easily removed from the surface. By the formation of long needle-like ice crystals, rather than sheets of ice, virtually none of the material is occluded within the ice crystals and the crystals formed are substantially pure water.

By employing the process and apparatus described, the additional step of separating the ice crystals from the material may be eliminated. This separation occurs within the freezing chamber and the removal of the material and the ice crystals separately results in the dehydrated material being free from ice crystals.

It will be understood that this invention is susceptible to modification in order to adapt it to different usages and conditions, and, accordingly, it is desired to comprehend such modifications within this invention as may fall within the scope of the appended claims.

What I claim is:

1. In a freezing apparatus for low temperature dehydration of a heat sensitive material, a jacketed tank having inner and outer walls, said tank being cooled by the circulation of a refrigerant within said jacket, a non-metallic surface mounted on the inner wall of said tank, and means for wiping said non-metallic surface.

2. In a freezing apparatus as claimed in claim 1 with said tank having a metallic inner wall.

3. In an apparatus for the formation of ice crystals as claimed in claim 1 with said non-metallic surface having a thickness between 1/16 in. and 2 in.

4. In an apparatus for the formation of ice crystals as claimed in claim 1, with said non-metallic surface comprising Lucite.

5. In a freezing apparatus for low temperature dehydration of a heat sensitive material as claimed in claim 1, with said non-metallic surface comprising a layer of material in contact with said heat sensitive material for the formation of long needle-like ice crystals thereon.

References Cited in the file of this patent

UNITED STATES PATENTS

| | | |
|---|---|---|
| 530,526 | Holden | Dec. 11, 1894 |
| 1,878,759 | Copeman | Sept. 20, 1932 |
| 1,963,842 | Gay | June 19, 1934 |
| 2,030,060 | Field | Feb. 11, 1936 |
| 2,078,938 | Field | May 4, 1937 |
| 2,119,182 | Schuftan | May 31, 1938 |
| 2,159,463 | Voorheis | May 23, 1939 |
| 2,259,066 | Gaston | Oct. 14, 1941 |
| 2,299,414 | Spiegl | Oct. 20, 1942 |
| 2,418,572 | Brennan | Apr. 8, 1947 |
| 2,435,285 | Lucia | Feb. 3, 1948 |
| 2,449,132 | Lucia | Sept. 14, 1948 |
| 2,559,205 | Venzelberger | July 3, 1951 |
| 2,602,304 | Randell | July 8, 1952 |
| 2,602,745 | Cunningham | July 8, 1952 |
| 2,683,357 | Albright | July 13, 1954 |
| 2,713,474 | Read | July 19, 1955 |